United States Patent [19]
Kundert

[11] Patent Number: 5,364,026
[45] Date of Patent: Nov. 15, 1994

[54] VENTILATION FAN CONTROL

[75] Inventor: Warren R. Kundert, Harvard, Mass.

[73] Assignee: Control Resources, Inc., Harvard, Mass.

[21] Appl. No.: 792,236

[22] Filed: Nov. 14, 1991

[51] Int. Cl.⁵ .................. F24F 7/02; F24F 7/007; F24F 11/053

[52] U.S. Cl. .................. 236/49.3; 236/78 B; 236/78 D; 236/DIG. 9; 417/32; 318/473; 318/471; 388/910; 388/916; 388/934

[58] Field of Search ............. 236/49.3, 78 B, 78 D, 236/DIG. 9; 388/934, 910, 916; 318/471, 472, 473; 417/32

[56] References Cited

U.S. PATENT DOCUMENTS

| | | | |
|---|---|---|---|
| 3,829,010 | 8/1974 | Jones | 346/49.3 |
| 3,862,718 | 1/1975 | Butler | 236/49.3 |
| 4,244,193 | 1/1981 | Haakenson | 236/49.3 |
| 4,251,026 | 2/1981 | Siegel et al. | 236/49.3 |
| 4,394,957 | 7/1983 | Newton, III | 236/49.3 |
| 5,049,801 | 9/1991 | Potter | 236/49.3 |

Primary Examiner—John K. Ford
Attorney, Agent, or Firm—Henry D. Pahl, Jr.

[57] ABSTRACT

The residential structure ventilating apparatus disclosed herein employs a variable speed exhaust fan. The speed is responsive to a sensor which detects air temperature at the exhaust port. The fan is energized when the sensed air temperature rises above a first preselectable temperature and the external environmental air is cooler that the air at the exhaust port. The fan speed is increased progressively from about one-half full speed at the preselected turn on temperature to full speed at a predetermined higher temperature. The fan is turned off when the exhaust port temperature falls below a second preselected temperature, lower than the first preselected temperature or when the external environmental temperature rises above the inside temperature, the fan speed being essentially constant between the first and second preselected temperatures.

4 Claims, 3 Drawing Sheets

VENTILATION FAN CONTROL

BACKGROUND OF THE INVENTION

The present invention relates to ventilation systems for residential structures and more particularly to such a system which provides automatic initiation and adjustment of exhaust fan operation.

Heretofore most whole house and attic ventilation systems have been operated either manually or by simple thermostats. While such systems can reduce requirements for air conditioning, their operation is often relatively uncontrolled and does not provide any adjustment for differing circumstances such as changing outdoor temperature and/or changes in internal thermal loading. While variable speed fans have been proposed heretofore, they have largely been designed for industrial and/or agricultural environments and the mode of operation was not well adapted to residential structures.

Among the several objects of the present invention may be noted the provision of a novel system for ventilating residential structures; the provision of such a system which employs a variable speed exhaust fan; the provision of such a system which adjusts fan speed as a function of exhaust air temperature to maintain a desired temperature within a living space; the provision of such a system whose operation is inhibited when the temperature of the external environmental air is not low enough to appropriately cool an inside space; the provision of such a system which utilizes controlled hysteresis to avoid unstable operation; the provision of such a system which minimizes acoustical noise; the provision of such a system which saves electrical energy; the provision of such a system which is highly reliable and which is of relatively simple and inexpensive construction. Other objects and features will be in part apparent and in part pointed out hereinafter.

SUMMARY OF THE INVENTION

The ventilating apparatus of the present invention includes a variable speed exhaust fan mountable in an exhaust port in a structure, the structure permitting the admission of external environmental air. A means is provided for sensing air temperature at the exhaust port and a first control circuit responds to the sensing means for enabling energization of the fan when the sensed air temperature rises above a first preselectable temperature and for disabling energization of the fan when the sensed air temperature falls below a second preselected temperature, lower than the first temperature. Another control circuit varies the speed of the fan for sensed air temperatures between the first or enabling temperature and a higher temperature, the fan speed increasing progressively from about one-half full speed at the first temperature to full speed at that higher temperature. The fan speed is essentially constant between the turn on temperature and the turn off temperature.

In accordance with another aspect of the invention, external air temperature is sensed and turning on of the fan is inhibited if the external air temperature is essentially not lower than the temperature at the exhaust port.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
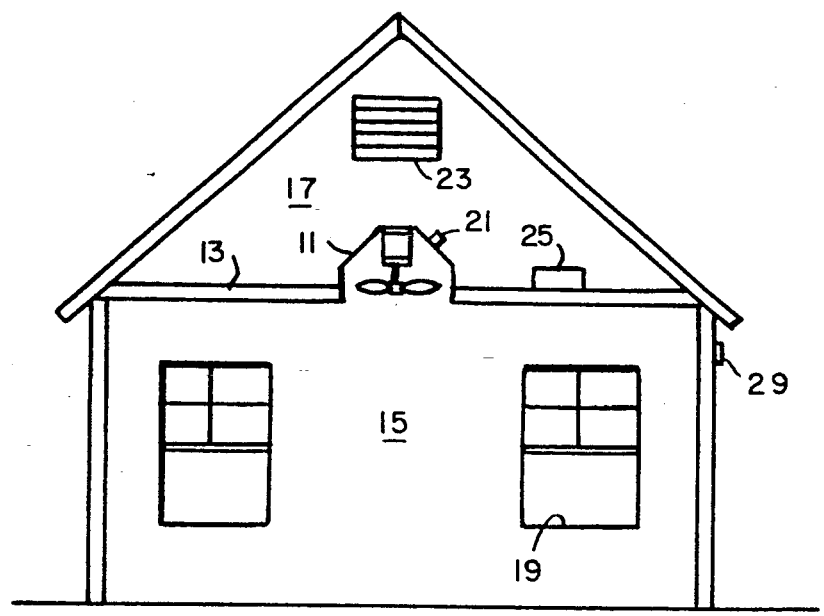
FIG. 1 is a diagrammatic illustration of a residential structure incorporating a so-called whole house ventilating fan.

Referring now to FIG. 1 which is a simplified and diagrammatic illustration of a residential structure or home, a so-called whole house ventilator fan 11 is provided in the ceiling 13 between the residential spaces 15 and an attic 17. The ceiling opening in which the fan 11 is mounted may be considered to constitute an exhaust port for the structure. The structure permits the admission of external environmental air, e.g. through an opened window as indicated at 19 or through conventional ventilation louvers, not shown. The temperature of air drawn from the living space 15 is sensed by means of a sensor 21 mounted on or near the fan. Air drawn into the attic space can be vented through louvers as indicated at 23.

In accordance with one aspect of the present invention, the operation of the fan 11 is automatically controlled by electronic circuitry which may, for example, be contained in a housing as indicated at 25. The sensor may be mounted on the fan, as shown, or in the housing 25 which is ventilated to permit sensing of air temperature, or at another location in proximity to the fan. As is explained in greater detail hereinafter, the electronic control circuitry responds also to the temperature of external environmental air, this latter temperature being measured by a suitable sensor 29.

Figure 2:
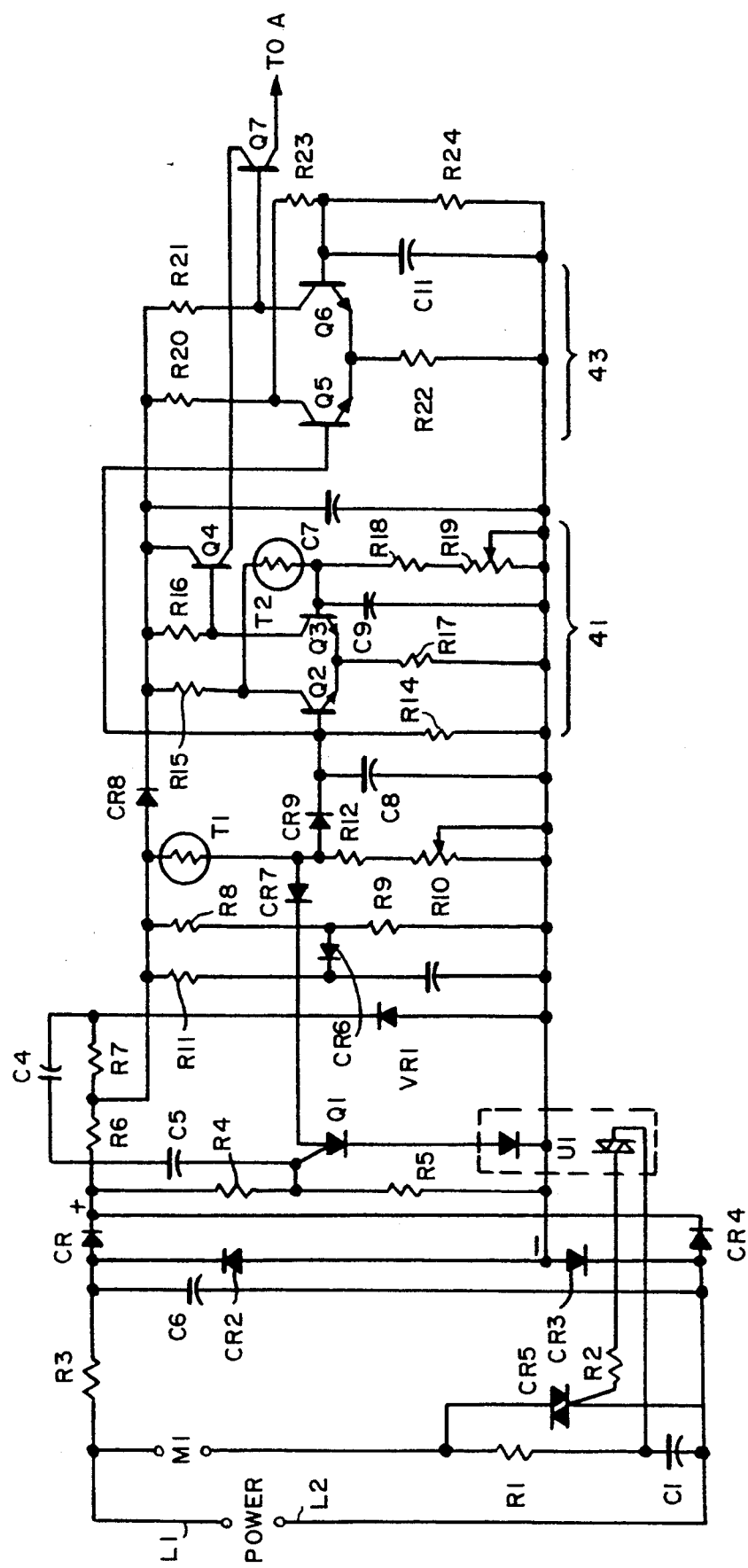
FIG. 2 is a schematic circuit diagram of control apparatus for controlling the fan of FIG. 1.

Referring now to FIG. 2, the embodiment illustrated there is intended for fans with a.c. motors, a.c. supply leads being indicated by reference characters L1 and L2. The motor of the fan, designated by reference character M1, is connected across the supply leads through a triac CR5. The triac is a triggerable semiconductor switching device which allows the power applied to the fan motor to be varied by phase angle modulation of the triggering. Triggering of the triac CR5 is implemented by control circuitry to the right hand side of the diagram. Full wave rectified current is provided to the control circuitry by a full wave bridge comprising rectifier CR1–CR4, a substantial voltage drop being provided by a resistor R3. Partial regulation of the supply voltage to this control circuitry is provided by a zener diode VR1. The network comprising resistors R6 and R7 and capacitor C4 compensates for firing angle variation which might otherwise be caused by supply line voltage variation.

Phase angle modulation is provided by means of a programmable uni-junction transistor Q1 which functions in a so-called ramp and pedestal mode of operation. When uni-junction transistor Q1 fires, it triggers the triac CR5 through an opto-isolator U1 comprising a light emitting diode D1 and a light sensitive diac or triggering diode D2. A reference voltage is applied to the gate electrode of uni-junction transistor Q1 by a voltage divider comprising resistors R4 and R5. This junction is designated point A. When the reference voltage is present, the programmable unijunction transistor will repetitively fire triggering the triac. However, if this point is pulled to a substantially more positive voltage by other control circuitry described hereinafter, firing will be terminated and the fan motor will be deenergized. Capacitor C5 accelerates the application of a sufficient voltage to this electrode at the start of each half cycle of the full-wave rectified supply voltage to permit controlled firing at all phase angles.

A variable or controlled voltage is applied to the anode of uni-junction transistor Q1 to provide the phase angle power modulation referenced previously. As is understood, the uni-junction transistor Q1 will fire when this variable voltage becomes slightly higher (more positive) than the voltage at the gate. In the ramp and pedestal mode of phase angle modulation, the ramp rate remains essentially constant and the phase shift is provided by shifting the starting point, i.e. the pedestal from which the ramp starts. In other words, the pedestal level provides the control. In the circuit of FIG. 2, the "ramp" component of the ramp and pedestal control scheme is obtained by the charging of a capacitor C3 through a resistor R11.

The control signal which sets the pedestal level is obtained by the logical ORing of an essentially fixed control voltage and a variable control voltage which varies as a function of air temperature. The logical ORing function is provided by a pair of diodes CR6 and CR7. The diode CR6 is connected to a voltage divider comprising resistors R8 and R9 which set a minimum speed for the fan. The diode CR7 is connected to a voltage divider comprising a thermistor T1 which constitutes the temperature sensor 21 of FIG. 1 together with a variable resistor R10 and fixed end resistor R12 which sets an upper limit on turn-on temperature. As is understood, the voltage at the junction between these elements will vary as a function of the air temperature at the exhaust port. The value set for the resistor R10 in relation to the nominal resistance of the thermistor T1 selects the turn on temperature.

The inside temperature sensitive voltage is also applied to one input of each of a pair of comparator circuits, the comparator circuits being designated respectively by reference characters 41 and 43. The comparator circuit 41 comprises a pair of NPN transistors Q2 and Q3 provided with a common emitter resistor R17 and respective collector load resistors R15 and R16. The comparator circuit 43 comprises a pair of NPN transistors Q5 and Q6 provided with a common emitter resistor R22 and respective collector load resistors R20 and R21.

The second input to the comparator 41 is a voltage obtained from a voltage divider comprising a thermistor T2 which constitutes the external air temperature sensor 29 of FIG. 1 in series with a variable resistance R19 and fixed end resistor R18. Hysteresis is provided by taking of the supply voltage for this voltage divider from the collector of transistor Q2. The collector of transistor Q3 is connected to control conduction through a PNP transistor Q4. Transistor Q4 is part of an AND circuit as described in greater detail hereinafter. Basically, Q4 is turned on when the outside temperature is essentially lower than the temperature at the exhaust port, e.g. by more than a preselectable margin or offset. Because of the hysteresis provided, Q4 will not be turned off until the outside temperature is higher than the inside temperature. A differential or hysteresis of about 5° F. is appropriate in most instances.

The comparator 43, in effect, compares the outlet temperatures sensed by thermistor T1 with a fixed or reference threshold value determined by a voltage divider comprising resistors R23 and R24. This threshold value may be considered to represent a turn on temperature. Hysteresis is provided by drawing the supply for voltage divider R23-R24 from the collector of transistor Q5. Accordingly, comparator 43 will not reverse state until the temperature at the exhaust port drops below the turn on temperature by a preselectable margin or offset.

The collector of transistor Q6 controls conduction through a PNP transistor Q7. The emitter-collector circuit of transistor Q7 is connected in series with the emitter-collector circuit of transistor Q4 so that conduction through transistor Q7 performs an ANDing function with conduction through transistor Q4. The collector of transistor Q7 is connected to the junction A of the trigger circuit to enable or disable the triggering function. When conduction is present through both transistors Q4 and Q7, junction A will be pulled more positive and will completely disable the oscillation of the programmable uni-junction triggering circuit. Disabling of the triggering circuit in turn turns off the fan motor M1 completely.

The operation of the control circuit of FIG. 2 may be summarized as follows. If, while the fan is de-energized, the temperature at the exhaust port rises above the turn on temperature set by divider R23, R24 and the outside air temperature is at or below the temperature at the exhaust port, the triggering oscillator will be enabled and the fan will be turned on. The speed of the fan will initially be determined by the minimum level set by the voltage divider R8 and R9 but if the exhaust temperature rises further, the speed will be increased up to a maximum which corresponds to a third temperature as determined by the characteristics of the thermistor T1. The relative values chosen for the resistors R8 and R9 are selected so that the initial level of energization runs the fan at about half speed.

As will be understood by the foregoing, the operation of the fan is essentially entirely automatic. When cooling is needed and the temperature of the external air is low enough to lower the inside temperature, operation of the fan will be automatically initiated. Further, as cooling demand increases, the speed of the fan will be increased. Since the speed of the fan is progressively increased as a function of exhaust air temperature, the fan is not run faster than is necessary to achieve a desired temperature within the living space. Accordingly, power consumption is reduced and the amount of noise generated by the fan is held to a minimum consistent with needs. Conversely, as demand drops below a second preselected temperature, lower than the turn on temperature, the fan will be automatically turned off. This prevents overchilling as may occur if a whole house ventilating fan is left on while the occupants of a residential structure retire. Advantageously, the speed of the fan is maintained essentially constant between the turn on and turn off temperatures. The control of the present invention, being entirely electronic, also avoids the need for any mechanical contacts in the power circuit to the fan motor.

Figure 3:
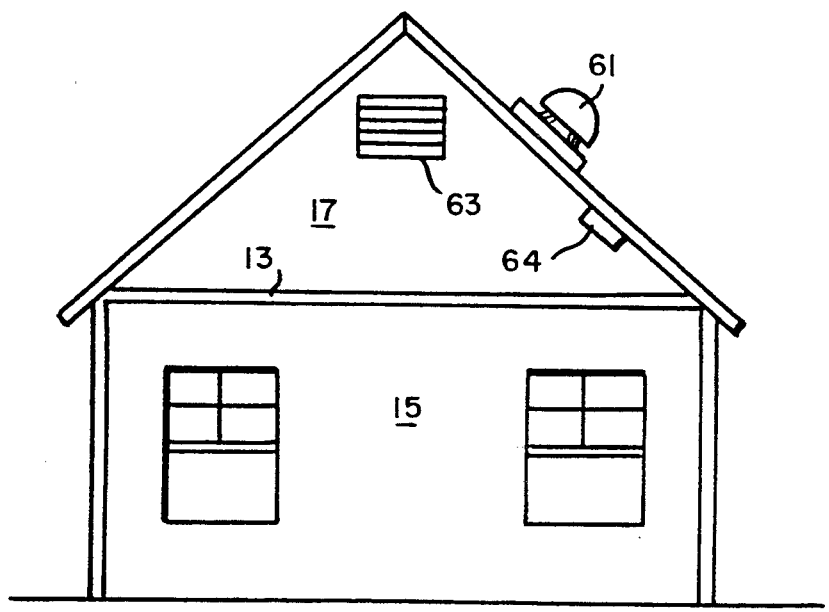
FIG. 3 is a diagrammatic illustration of a residential structure including a fan for providing forced attic ventilation.

While the circuit of FIG. 2 is advantageous in the controlling of so-called whole house ventilation systems, a somewhat simpler implementation is effective when in the case of a so-called power attic ventilator where the function of the ventilator is essentially to remove hot air from an attic space so as to reduce air conditioning load on a living environment below it. This situation is illustrated in FIG. 3 where a power attic ventilator fan provided with a suitable weatherized enclosure is indicated by reference character 61. The power ventilator is mounted in the roof or in an outside attic wall rather than in the ceiling between an attic and a living space. The opening in which the ventilator 61 is mounted may be considered an exhaust port for the attic structure. The attic space is vented, e.g. by a louver or attic window as indicated at reference character 63 so that external environmental air can be admitted to replace that exhausted by the power ventilator. Control circuitry and associated sensor are mounted in an enclosure 64 which is ventilated to permit sensing of air temperature near the exhaust port.

Figure 4:
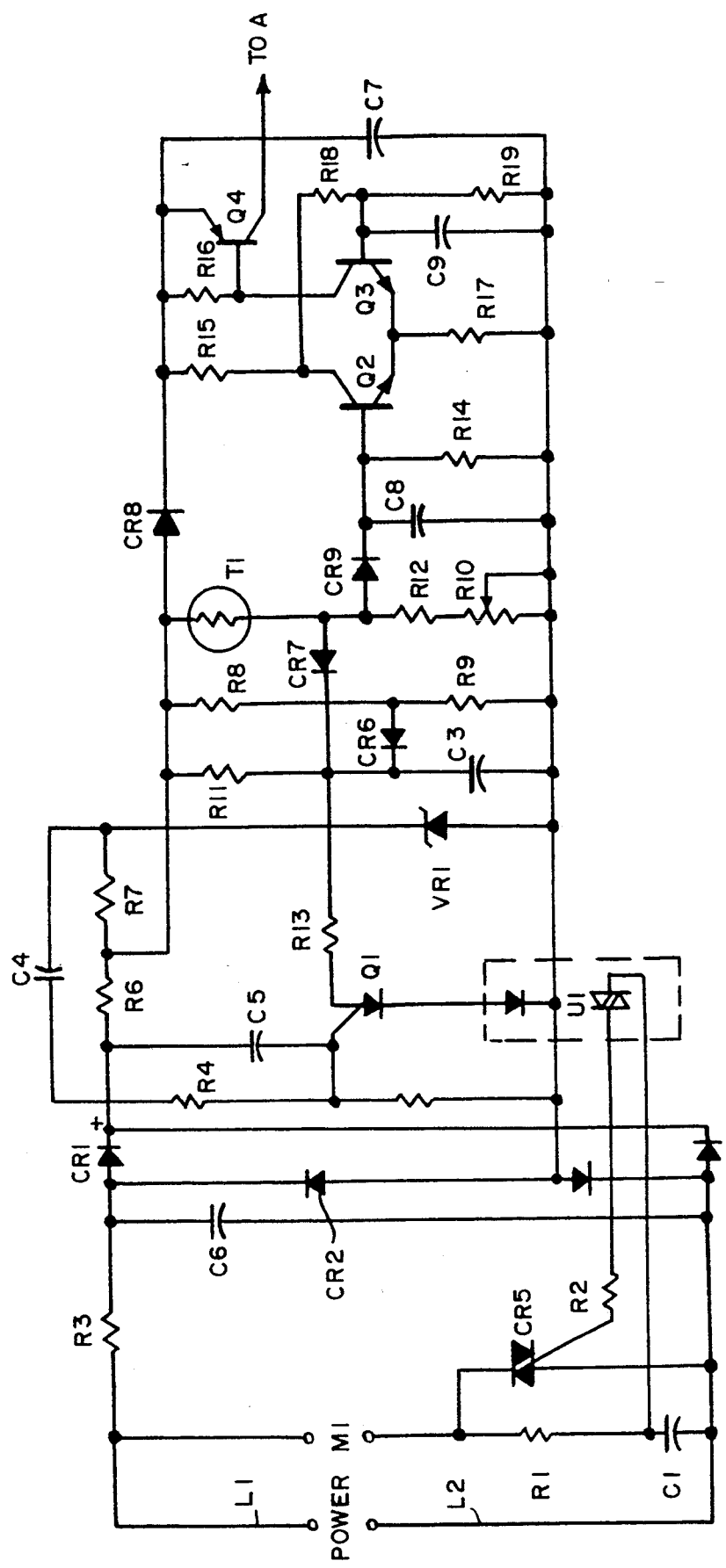
FIG. 4 is a schematic circuit diagram of a control circuit for controlling the fan of FIG. 3.

FIG. 4 illustrates control circuitry suitable for controlling the operation of the attic ventilator of FIG. 3. The circuitry of FIG. 4 is essentially similar to that illustrated in FIG. 2 except that the outside air temperature is not sensed and the comparator which conditions energization of the fan as a function of outside air temperature is omitted. Again, the operation of the system is essentially automatic. The power ventilator is turned on when the temperature at the exhaust port exceeds a preselected threshold temperature. Initially, the fan is run at essentially half speed but, if the exhaust air temperature increases further, the speed of the ventilator is increased up to a maximum which corresponds to a higher temperature. Again, hysteresis is applied so that instability is prevented. As temperature falls, the speed of the ventilator is maintained essentially at half speed until a temperature, lower than the turn on temperature, is reached at which the ventilator motor is de-energized completely.

In both embodiments described herein, variable speed fan operation is provided which controls fan speed to maintain only that level of air flow which is necessary to maintain the desired exhaust temperature. Accordingly, substantial reduction in electric power consumption is provided with attendant reduction in the cost of operation. Further, there is typically a substantial reduction in acoustic noise since, only in exceptional situations is the fan operating at full speed.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for ventilating a structure comprising:

a variable speed exhaust fan mountable in an exhaust port in the structure, said structure permitting the admission of external environmental air;

means including a triggerable semiconductor switching device for energizing said fan from a.c. supply means;

means for sensing air temperature at said exhaust port;

first control means including a comparator responsive to said sensing means and including analog feedback providing hysteresis for enabling triggering of said switching device when the sensed air temperature rises above a first preselectable temperature and for disabling triggering of said switching device when the sensed air temperature falls below a second preselected temperature lower than said first temperature; and second control means for varying the phase angle of triggering of said switching device responsive to said sensing means for varying the speed of said fan for sensed air temperatures between said first temperature and a third preselectable temperature, said fan speed increasing progressively from about one-half full speed at said first temperature to full speed at said third temperature, said fan speed being essentially constant between said first and second temperatures.

2. Apparatus for ventilating a structure comprising:

a variable speed exhaust fan mountable in an exhaust port in the structure, said structure permitting the admission of external environmental air;

means including a triggerable semiconductor switching device for energizing said fan from a.c. suppy means;

first sensing means for sensing air temperature at said exhaust port;

second sensing means for sensing the temperature of external environmental air;

first control means including a comparator responsive to said sensing means and including analog feedback providing hysteresis for enabling triggering of said switching device when A) the sensed air temperature rises above a first preselectable temperature and B) the external environmental air temperature is below the air temperature at said exhaust port and for disabling triggering of said switching device when the sensed air temperature falls below a second preselected temperature lower than said first temperature; and second control means for varying the phase angle of triggering of said switching device responsive to said sensing means for varying the speed of said fan for sensed air temperatures between said first temperature and a third preselectable temperature, said fan speed increasing progressively from about one-half full speed at said first temperature to full speed at said third temperature, said fan speed being essentially constant between said first and second temperatures.

3. Apparatus for ventilating a structure comprising:

a variable speed exhaust fan mountable in an exhaust port in the structure, said structure permitting the admission of external environmental air;

means including a triggerable semiconductor switching device for energizing said fan from a.c. suppy means;

first sensing means for sensing air temperature at said exhaust port;

second sensing means for sensing the temperature of external environmental air;

first control means including a comparator responsive to said sensing means and including analog feedback providing hysteresis for enabling triggering of said switching device when A) the sensed air temperature rises above a first preselectable temperature and B) the external environmental air temperature is below the air temperature at said exhaust port and for disabling energization of said fan when the sensed air temperature falls below a second preselected temperature lower than said first temperature or when outside environmental air temperature rises above inside air temperature by a preselected amount; and second control means for varying the phase angle of triggering of said switching device responsive to said sensing means for varying the speed of said fan for sensed air temperatures between said first temperature and a third preselectable temperature, said fan speed increasing progressively from about one-half full speed at said first temperature to full speed at said third temperature, said fan speed being essentially constant between said first and second temperatures.

4. Apparatus for ventilating a structure comprising:

an a.c. motor powered variable speed exhaust fan mountable in an exhaust port in the structure, said structure permitting the admission of external environmental air;

circuit means including a triggerable semiconductor switching device for selectively energizing the fan motor from a.c. supply leads;

first sensing means for sensing air temperature at said exhaust port;

second sensing means for sensing the temperature of external environmental air;

first control means including at least one comparator circuit means interconnected with said first and second sensing means for enabling triggering of said switching device to effect energization of said fan when A) the sensed air temperature rises above a first preselectable temperature and B) the external environmental air temperature is below the air temperature at said exhaust port and said comparator circuit means includes analog feedback providing hysteresis for disabling energization of said fan by disabling triggering of said switching device when the sensed air temperature falls below a second preselected temperature lower than said first temperature; and second control means responsive to said first sensing means for controlling the phase angle of triggering of said semiconductor switching device for varying the speed of said fan for sensed air temperatures between said first temperature and a third preselectable temperature, said fan speed increasing progressively from about one-half full speed at said first temperature to full speed at said third temperature, said fan speed being essentially constant between said first and second temperatures.

* * * * *

UNITED STATES PATENT AND TRADEMARK OFFICE
CERTIFICATE OF CORRECTION

PATENT NO. : 5,364,026

DATED : November 15, 1994

INVENTOR(S) : Warren R. Kundert

It is certified that error appears in the above-indentified patent and that said Letters Patent is hereby corrected as shown below:

Claim 2, Column 6, line 39, after "and", begin a new paragraph with "second control means...".

Claim 3, Column 7, line 1, after "disabling", "energization of said fan" should be changed to --triggering of said switching device--; and on line 6, after "and", begin a new paragraph with "second control means...".

Signed and Sealed this

Eighteenth Day of February, 1997

Attest:

BRUCE LEHMAN

*Attesting Officer*   *Commissioner of Patents and Trademarks*